(12) United States Patent
Shelar et al.

(10) Patent No.: US 10,951,515 B2
(45) Date of Patent: *Mar. 16, 2021

(54) LEVERAGING MULTI-STREAM TRANSPORT PROTOCOL CAPABILITIES FOR ROUTING

(71) Applicant: Citrix Systems, Inc., Fort Lauderdale, FL (US)

(72) Inventors: Sachin Shelar, Bengaluru (IN); Praveen Raja Dhanabalan, Bengaluru (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/666,021

(22) Filed: Oct. 28, 2019

(65) Prior Publication Data

US 2020/0067824 A1 Feb. 27, 2020

Related U.S. Application Data

(63) Continuation of application No. 15/951,665, filed on Apr. 12, 2018, now Pat. No. 10,484,266.

(51) Int. Cl.
*H04L 12/707* (2013.01)
*H04L 29/08* (2006.01)
(Continued)

(52) U.S. Cl.
CPC ........... *H04L 45/24* (2013.01); *H04L 43/12* (2013.01); *H04L 67/28* (2013.01); *H04L 67/42* (2013.01); *H04L 69/16* (2013.01)

(58) Field of Classification Search
CPC ... H04L 69/14; H04L 29/0818; H04L 45/245; H04L 47/2475; H04L 47/762;
(Continued)

(56) References Cited

U.S. PATENT DOCUMENTS 9,743,142 B2 *  8/2017  Cholas ............. H04N 21/43615
2008/0201748 A1 *  8/2008  Hasek .................. H04N 21/454
725/98

(Continued)

OTHER PUBLICATIONS

Notice of Allowance for U.S. Appl. No. 15/951,665, dated Jul. 17, 2019.

*Primary Examiner* — Jung Liu
(74) *Attorney, Agent, or Firm* — Foley & Lardner LLP

(57) ABSTRACT

Described embodiments provide systems and methods for performing multi-stream routing. A device may determine that a server is capable of handling multi-stream protocol connections. The device may identify packets communicated between the client and the server via a first interface for a first connection between a client and the server. The device may estimate, based on the packets, a link quality for each second interface for communicating with the server. The device may identify a policy to apply to the packets. The device may select one of the second interfaces for communicating packets between the client and the server based on a configuration mapping, the link quality, and the policy. The configuration mapping may specify which second interface is to be selected using a mapping of the link quality and the policy. The device may establish a second connection between the client and the server using the selected interface.

20 Claims, 9 Drawing Sheets

(51) Int. Cl.
*H04L 12/26* (2006.01)
*H04L 29/06* (2006.01)

(58) Field of Classification Search
CPC . H04L 47/785; H04L 43/0882; H04L 47/801;
H04L 47/803; H04L 67/28; H04L 67/42;
H04L 69/08; H04L 69/16; H04L 43/0852;
H04L 43/0888; H04W 80/06; H04W
76/10; H04W 48/16; H04W 72/12; H04W
88/182
See application file for complete search history.

(56) References Cited

U.S. PATENT DOCUMENTS

| | | | |
|---|---|---|---|
| 2009/0210912 A1* | 8/2009 | Cholas | H04N 5/4401 |
| | | | 725/82 |
| 2012/0203872 A1* | 8/2012 | Luby | H04L 69/14 |
| | | | 709/219 |
| 2013/0111038 A1* | 5/2013 | Girard | H04L 47/803 |
| | | | 709/226 |
| 2014/0044044 A1* | 2/2014 | Josiam | H04W 72/1226 |
| | | | 370/328 |
| 2014/0267571 A1* | 9/2014 | Periyannan | H04L 65/80 |
| | | | 348/14.08 |
| 2017/0366445 A1* | 12/2017 | Nemirovsky | H04L 45/24 |
| 2019/0028374 A1* | 1/2019 | Xu | H04L 45/64 |

\* cited by examiner

LEVERAGING MULTI-STREAM TRANSPORT PROTOCOL CAPABILITIES FOR ROUTING

CROSS-REFERENCE TO RELATED APPLICATION

This patent application is a continuation of, and claims priority to and the benefit of U.S. patent application Ser. No. 15/951,665, titled "LEVERAGING MULTI-STREAM TRANSPORT PROTOCOL CAPABILITIES FOR ROUTING," and filed Apr. 12, 2018, the contents of all of which are hereby incorporated herein by reference in its entirety for all purposes.

FIELD OF THE DISCLOSURE

The present application generally relates to routing of packets, including but not limited to systems and methods for performing multi-stream routing.

BACKGROUND

Certain Internet applications may involve parsing packets to route such packets from a start point to an exit point through a network. When the destination of the packets is changed from the initially designated exit point, the old connection may be terminated and a new connection may be established to carry out the routing of the packets. The resetting of the connection may lead to interruptions in communication between the start point and the exit point.

BRIEF SUMMARY

This summary is provided to introduce a selection of concepts in a simplified form that are further described below in the Detailed Description. This summary is not intended to identify key features or essential features, nor is it intended to limit the scope of the claims included herewith.

For certain Internet applications, a subset number of packets between a start point (e.g., a client) and an end point (e.g., a server) may be parsed to identify or match to various application-based policies. These application-based policies may include a data packet inspection (DPI) based firewall policy, a DPI-based quality of signal (QoS) policy, an intrusion detection (IDS) signature, and an intrusion prevention (IPS) signature, among others. In applying the application-based policies, an underlying connection for the packets may be steered through an exit point (different from the initially designated destination.) The policies can be used to select which exit point to route the packets based on various factors related to the packets, such as an application QoS requirement (e.g., priority of packets), a network bandwidth prerequisite (e.g., link quality), and a security compliance level (e.g., selection of packets for additional inspection), among others. When the packets are directed to another exit point in this manner during the middle of the communication session, the original underlying connection may be terminated because the exit points may have different network address translation (NAT) configurations. The alteration in the NAT configuration may lead to a connection reset in Transmission Control Protocol (TCP) and User Datagram Protocol (UDP) communications. The breaking of the initial connection may be of especial concern when there are multiple potential exit points for the packets from an intermediary network element or device handling the packets. Examples of the intermediary network element may include a branch office (e.g., an Internet breakout from the branch office) or a data center (e.g., a backhaul of the Internet through the data center). This may lead to interruptions in service, excessive network delays, and increased consumption of computing time.

In order to address these and other technical problems, the present disclosure is directed to systems and methods for performing multi-stream routing. Unlike single-path communications protocols such as the TCP and UDP communications protocols, multipath communications protocols (e.g., Multipath Transmission Control Protocol (MPTCP) and Quick User Datagram Protocol Internet Connections (QUIC)) may allow for connections to survive across multiple Internet Protocol (IP) addresses. By leveraging such multipath communications protocols, the packets of the original connection may be seamlessly switched over to a different exit point while the identified policies are applied to the packets.

To that end, an intermediary device handling the packets between a client and a server may determine whether the server is capable of using multipath communications protocols. If the server is determined to be capable of using multipath communications protocols, the intermediary device may identify an incoming connection from the client. The incoming connection from the client may be in accordance with a single-path or a multipath communications protocol, and may have an initially designated destination or exit point. If the communications are sent over a TCP connection, the intermediary device may initiate a proxy to map the packets of the TCP connection over to a MPTCP sub-flow. If the communications are sent over a QUIC connection, the intermediary device may track the packets of the QUIC connection. The intermediary device may identify a policy to apply to the connection based on the contents of the packets. For example, the packets may have been generated in connection with accessing resources for a particular application. The intermediary device may concurrently estimate a link quality for each of the links to which to communicate to the server. Each link may correspond to a different exit point referencing the server via a different connection. The intermediary device may then map the identified policy and the estimated link qualities to a configuration table specifying which link is to be selected to communicate to the server for the packets received from the client. Once one of the links is selected, the intermediary device may seamlessly switch over the packets from the old connection to a new connection established with the server. To establish a new MPTCP connection, the intermediary device may initiate a new sub-flow with the new address corresponding to the selected link to send the packets, and may then close the TCP connection. If the initial connection is in accordance with QUIC, the intermediary device may identify a new connection identifier corresponding to the selected link and may send packets with the new connection identifier. With the establishment of the new connection, the intermediary device may apply the policies to the subsequently received packets of the connection and forward the packets along the connection.

In one aspect, the present disclosure is directed to a method of performing multi-stream routing. A device intermediary to a client and a server may determine that the server is capable of handling multi-stream protocol connections. The device may identify one or more packets communicated between the client and the server via a first interface for a first connection established between the client and the server. The device may estimate, based on the one or more packets, a link quality for each of a plurality of second interfaces with which to communicate with the server. The device may identify a policy to apply to the one or more packets communicated between the client and the server. The device may select a second interface of the plurality of second interfaces via which to communicate subsequent packets between the client and the server based on a configuration mapping, the link quality estimated for each of the plurality of second interfaces, and the policy identified to be applied to the one or more packets. The configuration mapping may specify which of the plurality of second interfaces is to be selected using a mapping of the link quality and the policy. The device may establish a second connection between the client and the server using the second interface instead of the first interface.

In some embodiments, the device may identify an application executing on the client associated with the one or more packets from parsing the one or more packets. In some embodiments, identifying the policy to apply may include identifying the policy to apply to the one or more packets based on the application identified from parsing the one or more packets.

In some embodiments, the device may determine, based on the one or more packets, that the first connection established between the client and the server is in accordance with Transmission Control Protocol (TCP). In some embodiments, the device may map, responsive to determining that the first connection is in accordance with the TCP, the first connection to a subflow connection in accordance with Multipath TCP (MPTCP). In some embodiments, the device identifying the policy may include identifying the policy based on determining that the first connection established between the client and the server is in accordance with the TCP and mapping the first connection to the subflow connection.

In some embodiments, the device may determine, based on the one or more packets, that the first connection established between the client and the server is in accordance with Quick User Datagram Protocol Internet Connection (QUIC). In some embodiments, the device may forward, responsive to determining that the first connection is in accordance with the QUIC, the one or more packets from the client to the server via the first connection. In some embodiments, establishing the second connection may include identifying, responsive to determining that the first connection in accordance with TCP, a connection identifier of the second interface. In some embodiments, establishing the second connection may initiating, using the connection identifier of the second interface, a new subflow connection in accordance with MPTCP to map the subsequent packets communicated via the second interface for the second connection. In some embodiments, establishing the second connection may include identifying, responsive to determining that the first connection is in accordance with QUIC, a connection identifier for the first connection.

In some embodiments, the device may sort the link quality estimated for each of the plurality of second interfaces in ascending order. In some embodiments, selecting the second interface further comprises selecting the second interface from the plurality of second interfaces based on the plurality of link qualities for the corresponding plurality of second interfaces sorted in ascending order. In some embodiments, identifying the policy may include identifying the policy including at least one of an application-specific policy, a firewall policy, a Quality of Service (QoS) policy, an Intrusion Detection System (IDS) policy, and an Intrusion Prevention System (IPS) policy. In some embodiments, determining that the server is capable of handling multi-stream protocol connections may include parsing the one or more packets to identify at least one packet including an option indicating that the server is capable of handling multi-stream protocol connections. In some embodiments, the device may forward the packets received subsequent to establishing the second connection between the client and the server via the second interface.

In another aspect, the present disclosure is directed to a system for performing multi-stream routing. The system may include a packet analyzer executable on a device having one or more processors deployed intermediary between a client and a server. The packet analyzer may determine that the server is capable of handling multi-stream protocol connections. The packet analyzer may identify one or more packets communicated between the client and the server via a first interface for a first connection established between the client and the serve. The system may include a link quality estimator executable on the device. The link quality estimator may estimate, based on the one or more packets, a link quality for each of a plurality of second interfaces with which to communicate with the server. The system may include a policy manager executable on the device. The policy manager may identify a policy to apply to the one or more packets communicated between the client and the server. The system may include a link selector executable on the device. The link selector may select a second interface of the plurality of second interfaces via which to communicate subsequent packets between the client and the server based on a configuration mapping, the link quality estimated for each of the plurality of second interfaces, and the policy identified to be applied to the one or more packets. The configuration mapping may specify which of the plurality of second interfaces is to be selected using a mapping of the link quality and the policy. The system may include a routing engine executable on the device. The routing engine may establish a second connection between the client and the server using the second interface instead of the first interface.

In some embodiments, the policy manager may identify an application executing on the client associated with the one or more packets from parsing the one or more packets. In some embodiments, the policy manager may identify the policy to apply to the one or more packets based on the application identified from parsing the one or more packets.

In some embodiments, the packet analyzer may determine, based on the one or more packets, that the first connection established between the client and the server is in accordance with Transmission Control Protocol (TCP). In some embodiments, the packet analyzer may map, responsive to determining that the first connection is in accordance with the TCP, the first connection to a subflow connection in accordance with Multipath TCP (MPTCP). In some embodiments, the packet analyzer may determine, based on the one or more packets, that the first connection established between the client and the server is in accordance with Quick User Datagram Protocol Internet Connection (QUIC). In some embodiments, the packet analyzer may forward, responsive to determining that the first connection is in accordance with the QUIC, the one or more packets from the client to the server via the first connection.

In some embodiments, the routing engine may identify, responsive to a determination that the first connection in accordance with TCP, a connection identifier of the second interface selected based on the policy. In some embodiments, the routing engine may initiate, using the connection identifier of the second interface, a new subflow connection in accordance with MPTCP to map the subsequent packets communicated via the second interface for the second connection. In some embodiments, the routing engine may identify, responsive to a determination that the first connection is in accordance with QUIC, a connection identifier for the first connection. In some embodiments, the routing engine may initiate, using the connection identifier of the first connection, the second connection in accordance with User Datagram Protocol (UDP) for the subsequent packets communicated via the second interface.

In some embodiments, the link quality estimator may sort the link qualities estimated for each of the plurality of second interfaces in ascending order. In some embodiments, the link selector may select the second interface from the plurality of second interfaces based on the plurality of link qualities for the corresponding plurality of second interfaces sorted in ascending order. In some embodiments, the policy may include at least one of an application-specific policy, a firewall policy, a Quality of Service (QoS) policy, an Intrusion Detection System (IDS) policy, and an Intrusion Prevention System (IPS) policy. In some embodiments, the packet analyzer may determine that the server is capable of handling multi-stream protocols by parsing the one or more packets to identify at least one packet including an option indicating that the server is capable of handling multi-stream protocol connections. In some embodiments, the routing engine may forward the packets received subsequent to establishing the second connection between the client and the server via the second interface.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for virtualizing an application delivery controller;

Section D describes embodiments of systems and methods for providing a clustered appliance architecture environment; and Section E describes embodiments of systems and methods for performing multi-stream routing.

A. Network and Computing Environment

Figure 1A:
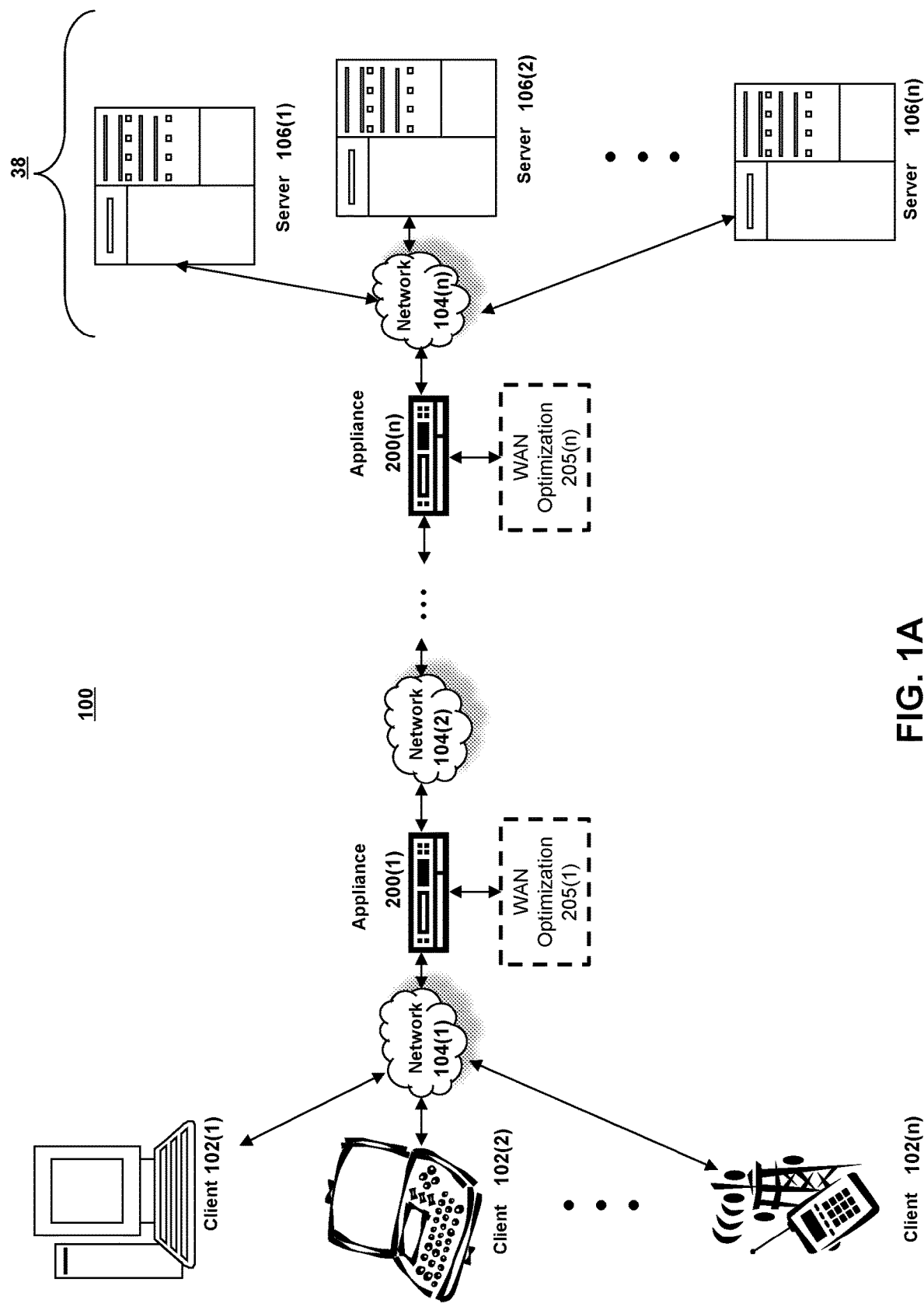
FIG. 1A is a block diagram of a network computing system, in accordance with an illustrative embodiment.

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as NetScaler® products sold by Citrix Systems, Inc. of Fort Lauderdale, Fla.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as CloudBridge® products sold by Citrix Systems, Inc. of Fort Lauderdale, Fla.

Figure 1B:
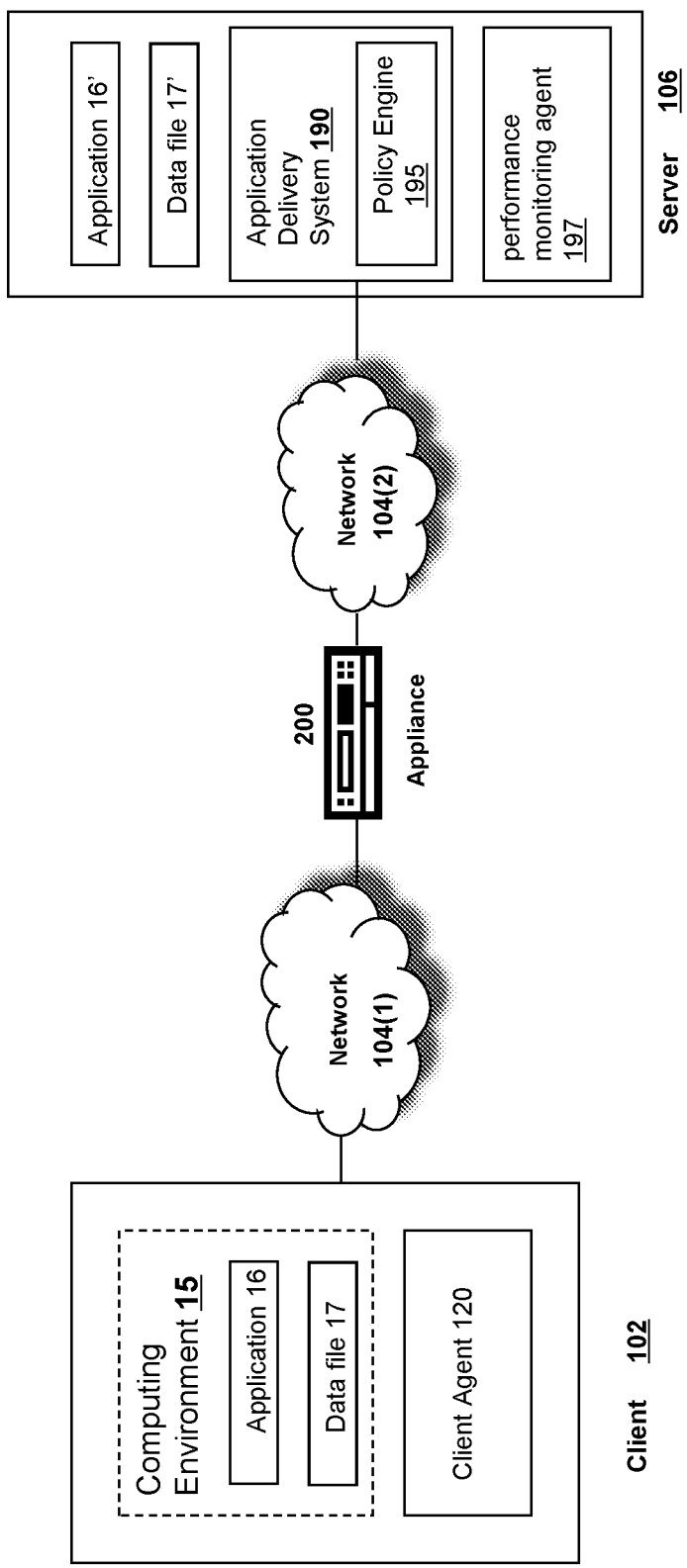
FIG. 1B is a block diagram of a network computing system for delivering a computing environment from a server to a client via an appliance, in accordance with an illustrative embodiment.

Referring to FIG. 1B, an example network environment, 100', for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 50 and computing environment 15. Computing environment 15 may execute or operate an application, 16, that accesses, processes or uses a data file 17. Computing environment 15, application 16 and/or data file 17 may be delivered via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as XenApp® or XenDesktop®.

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 50 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, Fla. The application may be any application related to real-time data communications, such as applications for streaming graphics, streaming video and/or audio or other data, delivery of remote desktops or workspaces or hosted services or applications, for example infrastructure as a service (IaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 50), servers 106 (e.g., agent 197) or an appliances 200 and/or 205 (agent not shown). In general, monitoring agents (e.g., 50 and/or 197) execute transparently (e.g., in the background) to any application and/or user of the device. In some embodiments, monitoring agent 197 includes any of the product embodiments referred to as EdgeSight by Citrix Systems, Inc. of Fort Lauderdale, Fla.

The monitoring agents may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
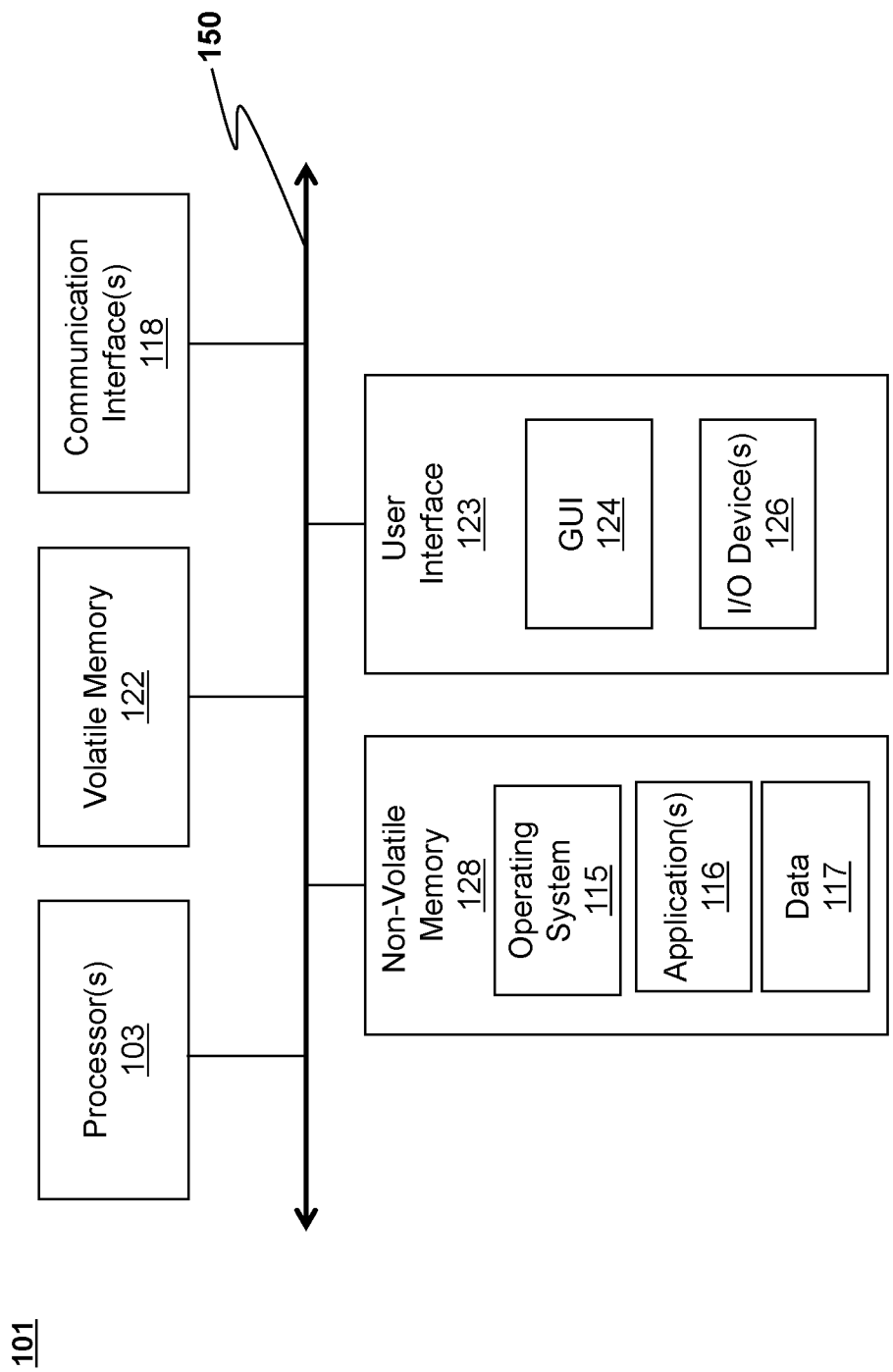
FIG. 1C is a block diagram of a computing device, in accordance with an illustrative embodiment.

As shown in FIG. 1C, computer 101 may include one or more processors 103, volatile memory 52 (e.g., RAM), non-volatile memory 58 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 53, one or more communications interfaces 118, and communication bus 150. User interface 53 may include graphical user interface (GUI) 54 (e.g., a touchscreen, a display, etc.) and one or more input/output (I/O) devices 56 (e.g., a mouse, a keyboard, etc.). Non-volatile memory 58 stores operating system 115, one or more applications 116, and data 117 such that, for example, computer instructions of operating system 115 and/or applications 116 are executed by processor(s) 103 out of volatile memory 52. Data may be entered using an input device of GUI 54 or received from I/O device(s) 56. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

Additional details of the implementation and operation of network environment 100, clients 102, servers 106, and appliances 200 and 205 may be as described in U.S. Pat. No. 9,538,345, issued Jan. 3, 2017 to Citrix Systems, Inc. of Fort Lauderdale, Fla., the teachings of which are hereby incorporated herein by reference.

B. Appliance Architecture

Figure 2:
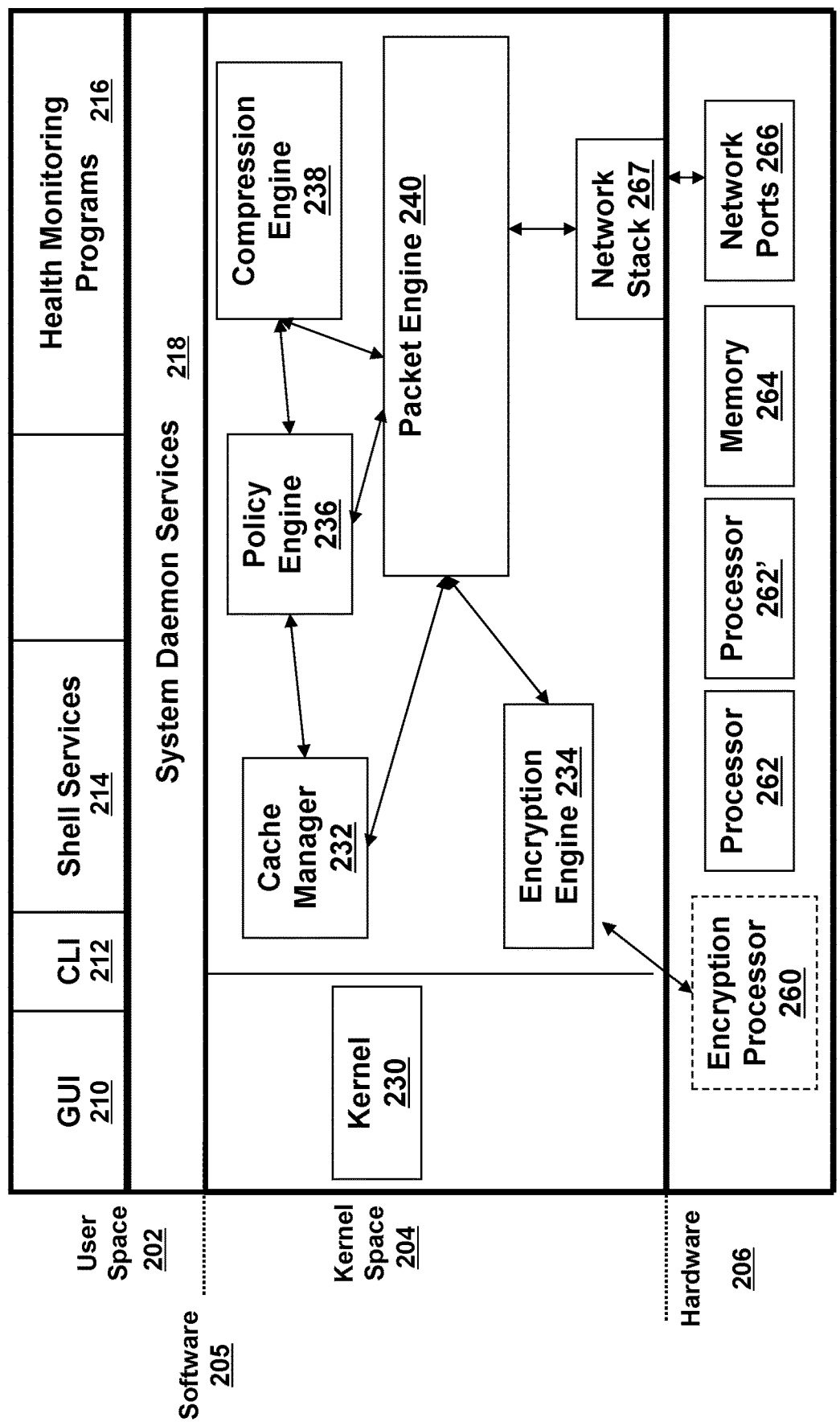
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application 104. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer 243 for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reducing the access time of the data. In some embodiments, the cache memory may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include the programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine whether a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layers connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 50 for establishing and exchanging communications with appliance 200 and/or server 106 via a network 104. Client 102 may have installed and/or execute one or more applications that are in communication with network 104. Client agent 50 may intercept network communications from a network stack used by the one or more applications. For example, client agent 50 may intercept a network communication at any point in a network stack and redirect the network communication to a destination desired, managed or controlled by client agent 50, for example to intercept and redirect a transport layer connection to an IP address and port controlled or managed by client agent 50. Thus, client agent 50 may transparently intercept any protocol layer below the transport layer, such as the network layer, and any protocol layer above the transport layer, such as the session, presentation or application layers. Client agent 50 can interface with the transport layer to secure, optimize, accelerate, route or load-balance any communications provided via any protocol carried by the transport layer.

In some embodiments, client agent 50 is implemented as an Independent Computing Architecture (ICA) client developed by Citrix Systems, Inc. of Fort Lauderdale, Fla. Client agent 50 may perform acceleration, streaming, monitoring, and/or other operations. For example, client agent 50 may accelerate streaming an application from a server 106 to a client 102. Client agent 50 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 50 may identify and determine one or more client-side attributes, such as: the operating system and/or a version of an operating system, a service pack of the operating system, a running service, a running process, a file, presence or versions of various applications of the client, such as antivirus, firewall, security, and/or other software.

Additional details of the implementation and operation of appliance 200 may be as described in U.S. Pat. No. 9,538, 345, issued Jan. 3, 2017 to Citrix Systems, Inc. of Fort Lauderdale, Fla., the teachings of which are hereby incorporated herein by reference.

C. Systems and Methods for Providing Virtualized Application Delivery Controller Referring now to FIG. 3, a block diagram of a virtualized environment 300 is shown. As shown, a computing device 302 in virtualized environment 300 includes a virtualization layer 303, a hypervisor layer 304, and a hardware layer 307. Hypervisor layer 304 includes one or more hypervisors (or virtualization managers) 301 that allocates and manages access to a number of physical resources in hardware layer 307 (e.g., physical processor(s) 321 and physical disk(s) 328) by at least one virtual machine (VM) (e.g., one of VMs 306) executing in virtualization layer 303. Each VM 306 may include allocated virtual resources such as virtual processors 332 and/or virtual disks 342, as well as virtual resources such as virtual memory and virtual network interfaces. In some embodiments, at least one of VMs 306 may include a control operating system (e.g., 305) in communication with hypervisor 301 and used to execute applications for managing and configuring other VMs (e.g., guest operating systems 310) on device 302.

In general, hypervisor(s) 301 may provide virtual resources to an operating system of VMs 306 in any manner that simulates the operating system having access to a physical device. Thus, hypervisor(s) 301 may be used to emulate virtual hardware, partition physical hardware, virtualize physical hardware, and execute virtual machines that provide access to computing environments. In an illustrative embodiment, hypervisor(s) 301 may be implemented as a XEN hypervisor, for example as provided by the open source Xen.org community. In an illustrative embodiment, device 302 executing a hypervisor that creates a virtual machine platform on which guest operating systems may execute is referred to as a host server. In such an embodiment, device 302 may be implemented as a XEN server as provided by Citrix Systems, Inc., of Fort Lauderdale, Fla.

Hypervisor 301 may create one or more VMs 306 in which an operating system (e.g., control operating system 305 and/or guest operating system 310) executes. For example, the hypervisor 301 loads a virtual machine image to create VMs 306 to execute an operating system. Hypervisor 301 may present VMs 306 with an abstraction of hardware layer 307, and/or may control how physical capabilities of hardware layer 307 are presented to VMs 306. For example, hypervisor(s) 301 may manage a pool of resources distributed across multiple physical computing devices.

In some embodiments, one of VMs 306 (e.g., the VM executing control operating system 305) may manage and configure other of VMs 306, for example by managing the execution and/or termination of a VM and/or managing allocation of virtual resources to a VM. In various embodiments, VMs may communicate with hypervisor(s) 301 and/or other VMs via, for example, one or more Application Programming Interfaces (APIs), shared memory, and/or other techniques.

In general, VMs 306 may provide a user of device 302 with access to resources within virtualized computing environment 300, for example, one or more programs, applications, documents, files, desktop and/or computing environments, or other resources. In some embodiments, VMs 306 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Figure 3:
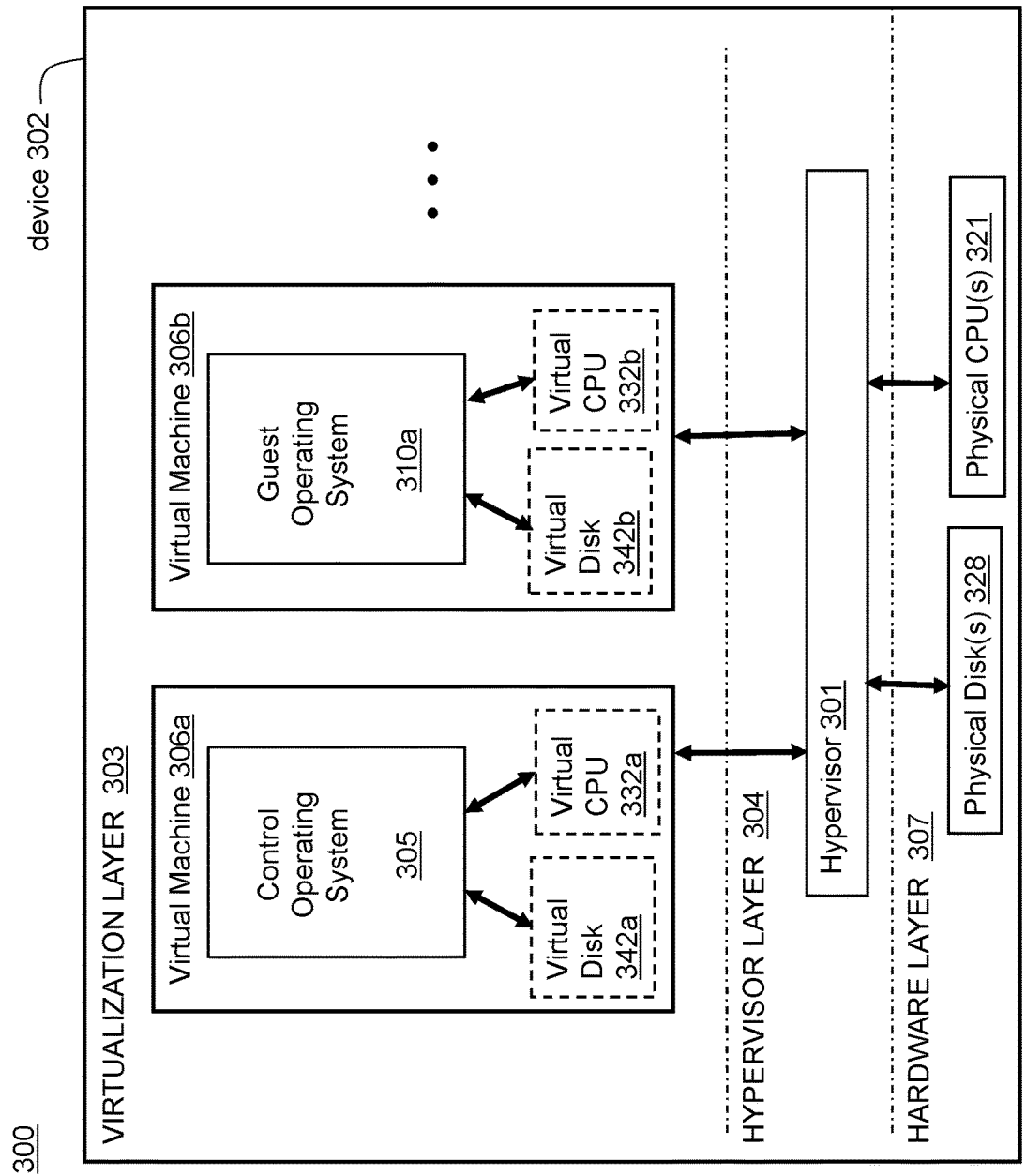
FIG. 3 is a block diagram of a virtualization environment, in accordance with an illustrative embodiment.

Although shown in FIG. 3 as including a single virtualized device 302, virtualized environment 300 may include a plurality of networked devices in a system in which at least one physical host executes a virtual machine. A device on which a VM executes may be referred to as a physical host and/or a host machine. For example, appliance 200 may be additionally or alternatively implemented in a virtualized environment 300 on any computing device, such as a client 102, server 106 or appliance 200. Virtual appliances may provide functionality for availability, performance, health monitoring, caching and compression, connection multiplexing and pooling and/or security processing (e.g., firewall, VPN, encryption/decryption, etc.), similarly as described in regard to appliance 200.

Additional details of the implementation and operation of virtualized computing environment 300 may be as described in U.S. Pat. No. 9,538,345, issued Jan. 3, 2017 to Citrix Systems, Inc. of Fort Lauderdale, Fla., the teachings of which are hereby incorporated herein by reference.

In some embodiments, a server may execute multiple virtual machines 306, for example on various cores of a multi-core processing system and/or various processors of a multiple processor device. For example, although generally shown herein as "processors" (e.g., in FIGS. 1C, 2 and 3), one or more of the processors may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment (e.g., 300) on a client 102, server 106 or appliance 200, such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example to balance the flows across the cores. For example, packet distribution may be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS may use a hashing scheme to determine a core or processor for processing a packet.

The RS S may generate hashes from any type and form of input, such as a sequence of values. This sequence of values can include any portion of the network packet, such as any header, field or payload of network packet, and include any tuples of information associated with a network packet or data flow, such as addresses and ports. The hash result or any portion thereof may be used to identify a processor, core, engine, etc., for distributing a network packet, for example via a hash table, indirection table, or other mapping technique.

Additional details of the implementation and operation of a multi-processor and/or multi-core system may be as described in U.S. Pat. No. 9,538,345, issued Jan. 3, 2017 to Citrix Systems, Inc. of Fort Lauderdale, Fla., the teachings of which are hereby incorporated herein by reference.

D. Systems and Methods for Providing a Distributed Cluster Architecture

Figure 4:
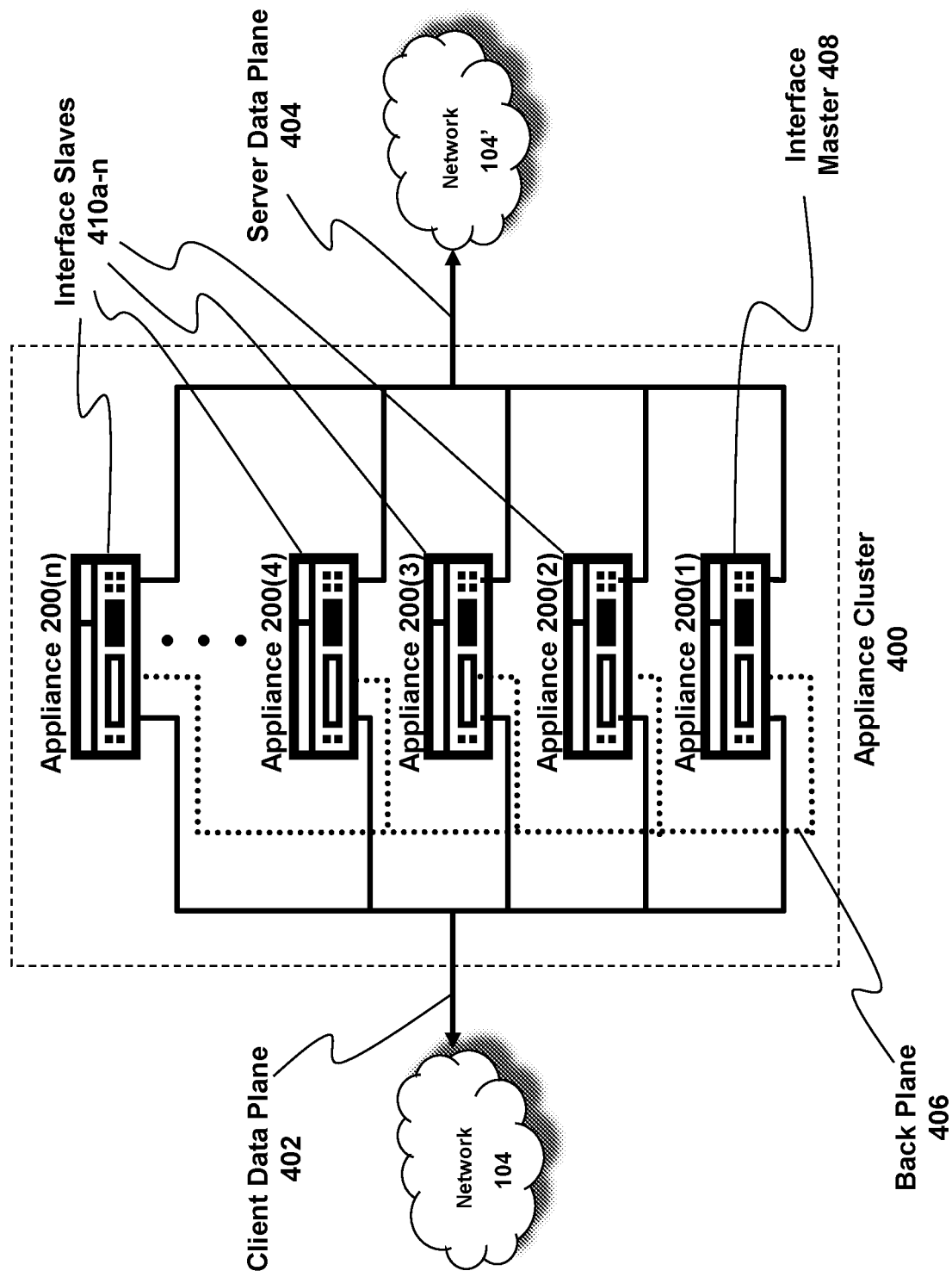
FIG. 4 is a block diagram of a cluster system, in accordance with an illustrative embodiment.

Although shown in FIGS. 1A and 1B as being single appliances, appliances 200 may be implemented as one or more distributed or clustered appliances. Individual computing devices or appliances may be referred to as nodes of the cluster. A centralized management system may perform load balancing, distribution, configuration, or other tasks to allow the nodes to operate in conjunction as a single computing system. Such a cluster may be viewed as a single virtual appliance or computing device. FIG. 4 shows a block diagram of an illustrative computing device cluster or appliance cluster 400. A plurality of appliances 200 or other computing devices (e.g., nodes) may be joined into a single cluster 400. Cluster 400 may operate as an application server, network storage server, backup service, or any other type of computing device to perform many of the functions of appliances 200 and/or 205.

In some embodiments, each appliance 200 of cluster 400 may be implemented as a multi-processor and/or multi-core appliance, as described herein. Such embodiments may employ a two-tier distribution system, with one appliance if the cluster distributing packets to nodes of the cluster, and each node distributing packets for processing to processors/cores of the node. In many embodiments, one or more appliances 200 of cluster 400 may be physically grouped or geographically proximate to one another, such as a group of blade servers or rack mount devices in a given chassis, rack, and/or data center. In some embodiments, one or more of appliances 200 of cluster 400 may be geographically distributed, with appliances 200 not physically or geographically co-located. In such embodiments, geographically remote appliances may be joined by a dedicated network connection and/or VPN. In geographically distributed embodiments, load balancing may also account for communications latency between geographically remote appliances.

In some embodiments, cluster 400 may be considered a virtual appliance, grouped via common configuration, management, and purpose, rather than as a physical group. For example, an appliance cluster may comprise a plurality of virtual machines or processes executed by one or more servers.

As shown in FIG. 4, appliance cluster 400 may be coupled to a first network 104(1) via client data plane 402, for example to transfer data between clients 102 and appliance cluster 400. Client data plane 402 may be implemented a switch, hub, router, or other similar network device internal or external to cluster 400 to distribute traffic across the nodes of cluster 400. For example, traffic distribution may be performed based on equal-cost multi-path (ECMP) routing with next hops configured with appliances or nodes of the cluster, open-shortest path first (OSPF), stateless hash-based traffic distribution, link aggregation (LAG) protocols, or any other type and form of flow distribution, load balancing, and routing.

Appliance cluster 400 may be coupled to a second network 104(2) via server data plane 404. Similarly to client data plane 402, server data plane 404 may be implemented as a switch, hub, router, or other network device that may be internal or external to cluster 400. In some embodiments, client data plane 402 and server data plane 404 may be merged or combined into a single device.

In some embodiments, each appliance 200 of cluster 400 may be connected via an internal communication network or back plane 406. Back plane 406 may enable inter-node or inter-appliance control and configuration messages, for inter-node forwarding of traffic, and/or for communicating configuration and control traffic from an administrator or user to cluster 400. In some embodiments, back plane 406 may be a physical network, a VPN or tunnel, or a combination thereof.

Additional details of cluster 400 may be as described in U.S. Pat. No. 9,538,345, issued Jan. 3, 2017 to Citrix Systems, Inc. of Fort Lauderdale, Fla., the teachings of which are hereby incorporated herein by reference.

E. Systems and Methods for Performing Multi-Stream Routing

For certain Internet applications, a subset number of packets between a start point (e.g., a client) and an end point (e.g., a server) may be parsed to identify or match to various application-based policies. These application-based policies may include a data packet inspection (DPI) based firewall policy, a DPI-based quality of signal (QoS) policy, an intrusion detection (IDS) signature, and an intrusion prevention (IPS) signature, among others. In applying the application-based policies, an underlying connection for the packets may be steered through an exit point different from the initially designated destination. The policies can be used to select which exit point to route the packets based on various factors related to the packets, such as an application QoS requirement (e.g., priority of packets), a network bandwidth prerequisite (e.g., link quality), and a security compliance level (e.g., selection of packets for additional inspection), among others. When the packets are directed to another exit point in this manner during the middle of the communication session, the original underlying connection may be terminated, because the exit points may have different network address translation (NAT) configurations. The alteration in the NAT configuration may lead to a connection reset in Transmission Control Protocol (TCP) and User Datagram Protocol (UDP) communications. The breaking of the initial connection may be of especial concern when there are multiple potential exit points for the packets from an intermediary network element or device handling the packets. Examples of the intermediary network element may include a branch office (e.g., an Internet breakout from the branch office) or a data center (e.g., a backhaul of the Internet through the data center). This may lead to interruptions in service, excessive network delays, and increased consumption of computing time.

In order to address these and other technical problems, the present disclosure is directed to systems and methods for performing multi-stream routing. Unlike single-path communications protocols such as the TCP and UDP communications protocols, multipath communications protocols (e.g., Multipath Transmission Control Protocol (MPTCP) and Quick User Datagram Protocol Internet Connections (QUIC)) may allow for connections to survive across multiple Internet Protocol (IP) addresses. By leveraging such multipath communications protocols, the packets of the original connection may be seamlessly switched over to a different exit point while the identified policies are applied to the packets.

To that end, an intermediary device handling the packets between a client and a server may determine whether the server is capable of using multipath communications protocols. If the server is determined to capable of using multipath communications protocols, the intermediary device may identify an incoming connection from the client. The incoming connection from the client may be in accordance to a single-path or a multipath communications protocol, and may have an initially designated destination or exit point. If the communications are sent over a TCP connection, the intermediary device may initiate a proxy to map the packets of the TCP connection over to a MPTCP sub-flow. If the communications are sent over a QUIC connection, the intermediary device may track the packets of the QUIC connection. The intermediary device may identify a policy to apply to the connection based on the contents of the packets. For example, the packets may have been generated in connection with accessing resources for a particular application. The intermediary device may concurrently estimate a link quality for each of the links to which to communicate to the server. Each link may correspond to a different exit point referencing the server via a different connection. The intermediary device may then map the identified policy and the estimated link qualities to a configuration table specifying which link is to be selected to communicate to the server for the packets received from the client. Once one of the links is selected, the intermediary device may seamlessly switch over the packets from the old connection to a new connection established with the server. To establish a new MPTCP connection, the intermediary device may initiate a new sub-flow with the new address corresponding to the selected link to send the packets, and may then close the TCP connection. If the initial connection is in accordance with QUIC, the intermediary device may identify a new connection identifier corresponding to the selected link and may send packets with the new connection identifier. With the establishment of the new connection, the intermediary device may apply the policies to the subsequently received packets of the connection and forward the packets along the connection.

Figure 5A:
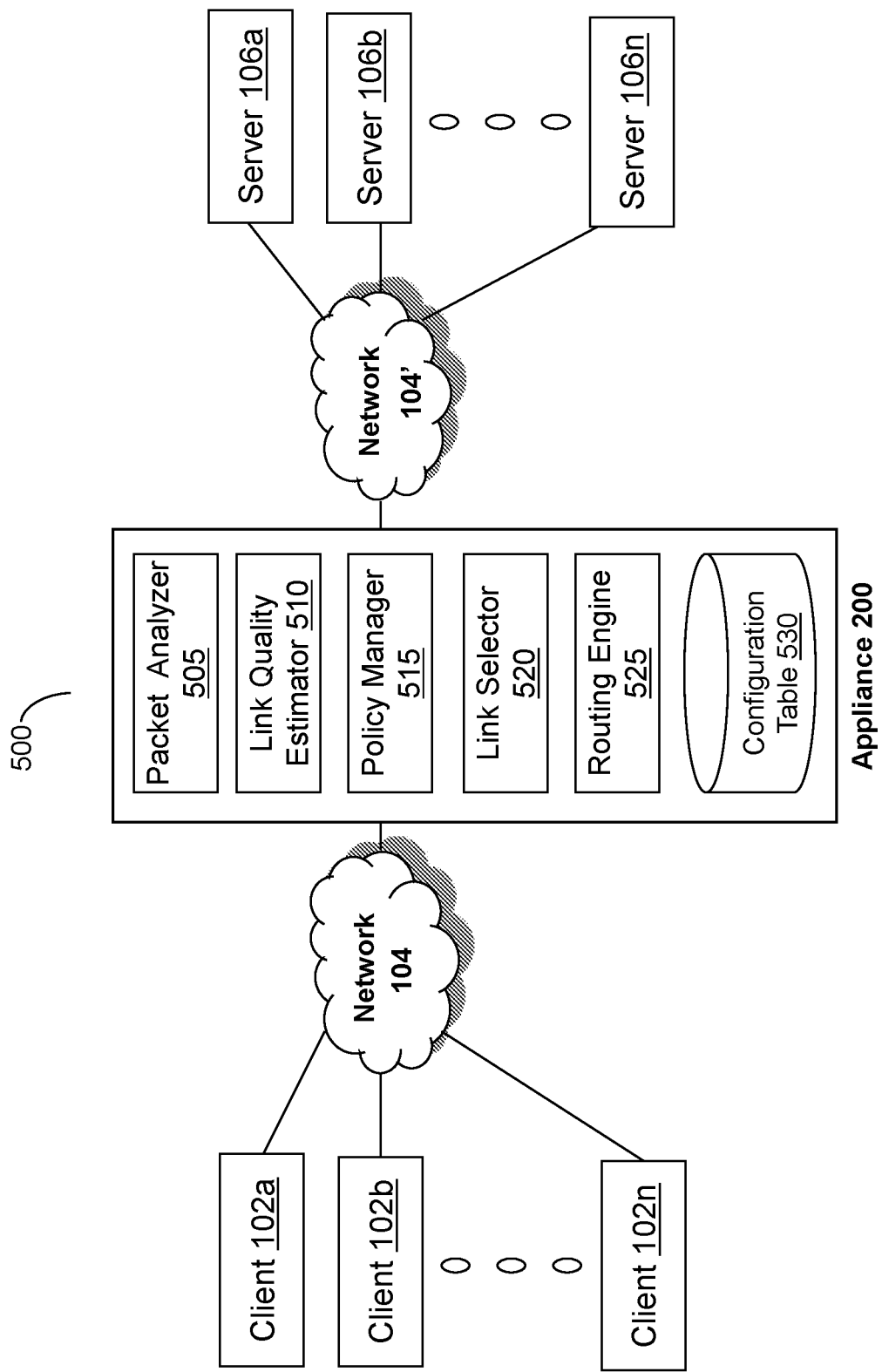
FIG. 5A is a block diagram of a system for performing multi-stream routing.

Referring to FIG. 5A, one embodiment of a system 500 for performing multi-stream routing is depicted. In brief summary, the system 500 may include a set of clients 102a-n (hereinafter generally referred to as client 102), an appliance 200, and a set of servers 106a-n (hereinafter generally referred to as server 106). The appliance 200 may be an intermediary device deployed or residing between at least one client device 102 connected via network 104 and at least one server 106 connected via network 104'. In some embodiments, the appliance 200 may be part of a branch-office (sometimes referred to as a remote-office) to aggregate and route communications between the clients 102 and the servers 106 via the networks 104 and 104'. In some embodiments, the appliance 200 may be part of a data center to manage a set of branch-offices and to aggregate and route communications among the clients 102, the servers 106, and other instances of the appliance 200 via the networks 104 and 104'. The appliance 200 may include a policy analyzer 505, a link quality estimator 510, a policy manager 515, a link selector 520, a routing engine 525, and a configuration mapping 530 maintained on a database.

The systems and methods of the present solution may be implemented in any type and form of device, including clients, servers and/or appliances 200. As referenced herein, a "server" may sometimes refer to any device in a client-server relationship, e.g., an appliance 200 in a handshake with a client device 102. The present systems and methods may be implemented in any intermediary device or gateway, such as any embodiments of the appliance or devices 200 described herein. Some portion of the present systems and methods may be implemented as part of a packet processing engine and/or virtual server of an appliance, for instance. The systems and methods may be implemented in any type and form of environment, including multi-core appliances, virtualized environments and/or clustered environments described herein.

Figure 5B:
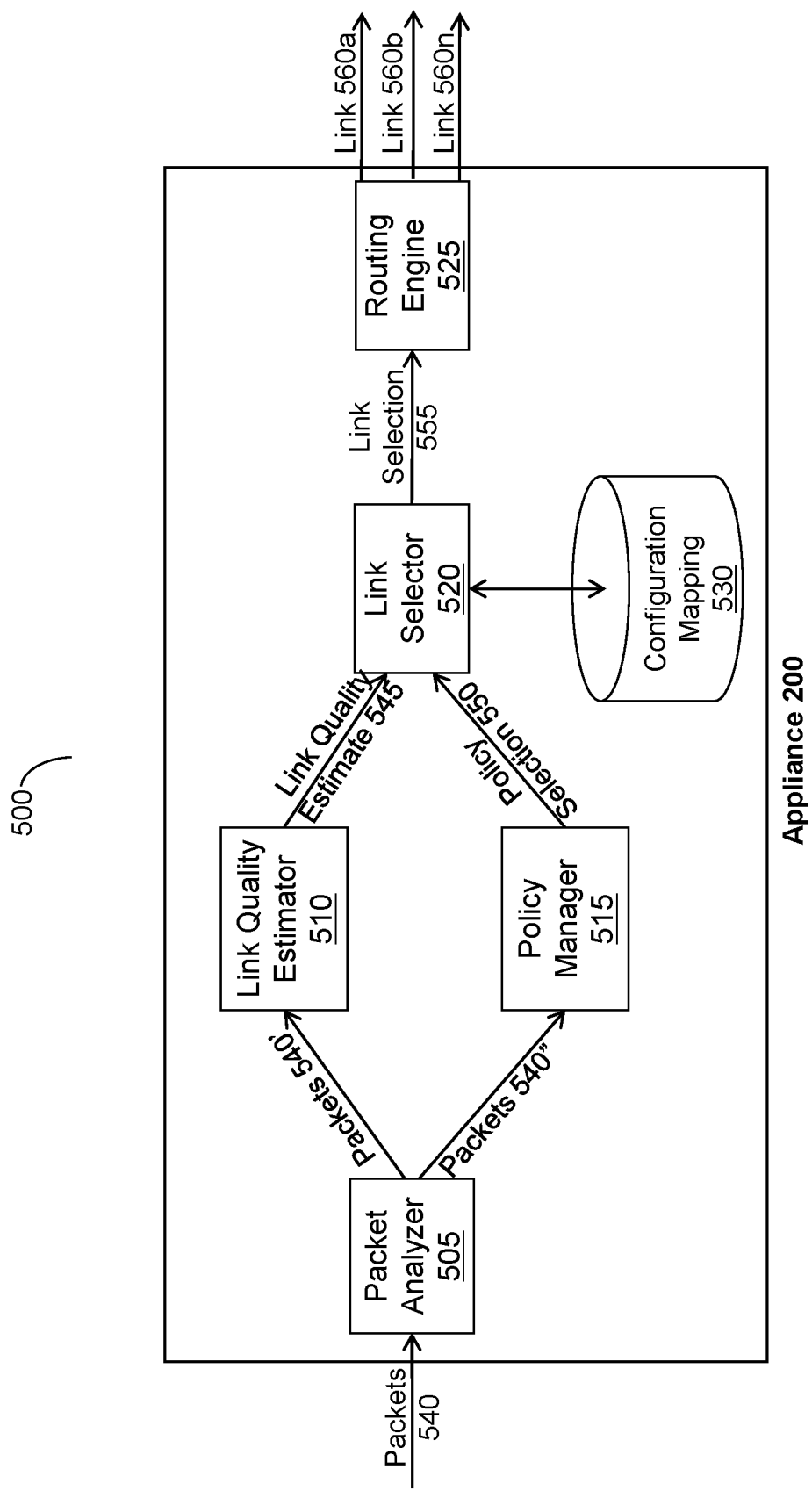
FIG. 5B is a communication diagram of an appliance in a system for performing multi-stream routing.

Referring also to FIG. 5B in conjunction with FIG. 5A, one embodiment of the appliance 200 in the system 500 for performing multi-stream routing is depicted in further detail. The packet analyzer 505 executing on the appliance 200 may receive, intercept, or otherwise identify a set of packets 540. The set of packets 540 may be communicated between at least one client 102 and at least one server 106. The set of packets 540 may be communicated via a first interface for a first connection between the client 102 and the server 106. In some embodiments, the set of packets 540 identified by the packet analyzer 505 may be incoming from the client 102 via the first interface for the first connection. In some embodiments, the set of packets 540 identified by the packet analyzer 505 may be incoming from the server 106 via the first interface for the first connection. In some embodiments, the set of packets 540 may be part of a connection initiation (e.g., a handshake) between the client 102 and server 106.

The first connection for the packets 540 established between the client 102 and the server 106 may be in accordance with a transport layer communications protocol. The transport layer communications protocol may be a single path protocol such as the Transmission Control Protocol (TCP), User Datagram Protocol (UDP), and Datagram Congestion Control Protocol (DCCP), among others. The transport layer communications protocol may be a multipath protocol (sometimes referred to as a multi-stream protocol), such as Multipath TCP (MPTCP), Stream Control Transmission Protocol (SCTP), Resource Reservation Protocol (RSVP), Session Initial Protocol (SIP), and Quick UDP Internet Connections (QUIC), among others. The first interface may correspond to one of a set of links 560a-n (hereinafter generally referred to as link 560) for the first connection between the client 102 and the server 106 through the network 104' or 104". Each link 560 may correspond to one of a set of communication paths between the client 102 and the server 106 or between the appliance 200 and the server 106. In some embodiments, there may be initially a single link 560 or a single communication path between the client 102 and the server 106 via the network 104" when the first connection is in accordance with a single path communications protocol. In some embodiments, there may be one or more links 560 between the client 102 and one or more servers 106 when the first connection is in accordance with a multipath communications protocol. The one or more links 560 may be between a single client 102 and a single server 106 or a single client 102 and multiple servers 106.

Each packet 540 may include a header and a body containing message data. For packets 540 in accordance with single path communications protocols, the header of the packet 540 may specify a source address, a source port, a destination address, a destination port, a protocol number, one or more options, and a checksum, among others. The source address or source port may correspond to one of the clients 102 or one of the server 106. The source address or source port of packets 540 arriving from the client 102 may be initially set to the server 106. The source address or source port of packets 540 arriving from the server 106 may initially set to the client 102. The destination address or destination port may correspond to one of the clients 102 or one of the servers 106. The destination address or destination port of packets 540 arriving from the client 102 may be initially set to the server 106. The destination address or destination port of packets 540 arriving from the server 106 may initially set to the client 102. For packets 540 in accordance with multipath communications protocols, the header of the packet 540 may include a connection identifier (CID) corresponding to one of the links 560a-n between the client 102 and the server 106.

The packet analyzer 505 may parse the each packet 540 communicated between the client 102 and the server 106. In parsing the packets 540, the packet analyzer 505 may identify the header and the body of each packet 540. For each packet 540, the packet analyzer 505 may parse the header of the packet 540 to identify one or more fields of the packet 540, such as the source address, the source port, the destination address, the destination port, the protocol number, the one or more options, the checksum, and the connection identifier. Based on the source address or the source port, the packet analyzer 505 may identify one or any of the clients 102 or the servers 106 as an origin of the packet 540. Based on the destination address or the destination port, the packet analyzer 505 may identify one or any of the clients 102 or the servers 106 as an origin of the packet 540.

The packet analyzer 505 may determine whether the server 106 is capable of handling multipath communications protocols. In some embodiments, the packet analyzer 505 may determine whether the server 106 is capable of handling based on the one or more options parsed from the packets 540. In some embodiments, the determination of whether the server 106 is capable of handling multipath communications protocols may be based on parsing the packets 540 originating from the server 106. The packet analyzer 505 may determine whether any of the options identified from parsing the packets 540 indicate that the server 106 is capable of handling multipath communications protocols. In some embodiments, the packet analyzer 505 may identify whether any of the options of the header of the packet 540 match a predefined symbol indicating that the server 106 is capable of handling multipath communications protocols. The symbol, for example, may be "MP_CAPABLE" for packets 540 in accordance with the MPTCP. When the option matches the predefined symbol, the packet analyzer 505 may determine that the server 106 is capable of handling multipath communications protocols. Otherwise, when none of the options match the predefined symbol, the packet analyzer 505 may determine that the server 106 is not capable of handling multipath communications protocols.

In some embodiments, the packet analyzer 505 may determine whether the server 106 is capable of handling multipath protocol communications based on the existence or lack of fields in the header of the packets 540. When the header of one of the packets 540 contains the connection identifier in accordance with a multipath communications protocols, the packet analyzer 505 may determine that the server 106 is capable of handling multipath communications protocols. When the header of one of the packets 540 does not contain the connection identifier in accordance with a multipath communications protocols, the packet analyzer 505 may determine that the server 106 is not capable of handling multipath communications protocols. A similar determination of whether the client 102 is capable of handling multipath communications protocols may be performed by the packet analyzer 505.

If the server 106 is determined to be incapable of handling multipath communications protocols, the appliance 200 may proceed to handle the packets 540 communicated between the server 102 and the client 106 in accordance to single path communications protocols. In brief, the packet analyzer 505 may forward a copy of the packets 540" to the policy manager 515. Based on the packets 540", the policy manager 515 may identify a policy to apply to the packets 540". The policy identified by the policy manager 515 may involve a changing of the destination address or destination port of the packets 540". As a consequence of the change in the destination address or port of the packet 540", the routing engine 525 may terminate the first connection, thus leading to an interruption in the communications between the client 102 and the server 106. The routing engine 525 may subsequently initialize a new connection between the client 102 and the server 106 to forward the packets 540" between the client 102 to the server 106 via the appliance 200.

On the other hand, if the server 106 is determined to be capable of handling multipath communications protocols, the packet analyzer 505 may forward, relay, or otherwise provide the packets 540 to the link quality estimator 510 and the policy manager 515. In some embodiments, the packet analyzer 505 may forward a first copy of packets 540' to the link quality estimator 510 and a second copy of packets 540" to the policy manager 515. In providing the packets 540, the packet analyzer 505 may determine with which communications protocol the first connection for the packets 540 communicated between the client 102 and the server 106 is in accordance. As discussed above, the communications protocol may be of the transport layer, and may be a single path communications protocol (e.g., Transmission Control Protocol (TCP), User Datagram Protocol (UDP), and Datagram Congestion Control Protocol (DCCP)) or a multipath communications protocol (e.g., Multipath TCP (MPTCP), Stream Control Transmission Protocol (SCTP), Resource Reservation Protocol (RSVP), Session Initial Protocol (SIP), and Quick UDP Internet Connections (QUIC)). In some embodiments, the packet analyzer 505 may determine whether the first connection between the client 102 and the server 106 is in accordance with a single path communications protocol or a multipath communications protocol by parsing the packets 540. The determination of whether the first connection is in accordance with a single path communications protocol or a multipath communications protocol may be based on an existence or lack of one or more fields identified from the header of the packet 540. The packet analyzer 505 may determine that the first connection is in accordance with a multipath communications protocol, with the identification of the connection identifier in the header of packet 540. In some embodiments, the packet analyzer 505 may determine that the first connection is in accordance with a single path communications protocol, when the connection identifier is identified as lacking in the header of the packet 540. In some embodiments, the packet analyzer 505 may forward the packets 540 to the server 106, concurrent with providing the first copy of packets 540' to the link quality estimator 510 and the second copy of packets 540" to the policy manager 515.

When the first connection between the client 102 and the server 106 is determined to be in accordance with a single path communications protocol, the packet analyzer 505 may map the packets 540 to a proxy connection in accordance with a multipath communications protocol. The proxy connection may be one of multiple proxy connections in accordance with the multipath communications protocol. In this manner, the incoming connection from the client 102 to the appliance 200 may be in accordance with a single path communications protocol, whereas the outgoing connection from the appliance 200 to the server 106 may be in accordance with a multipath communications protocol. In some embodiments, the packet analyzer 505 may determine that the first connection between the client 102 and the server 106 is in accordance with the Transmission Control Protocol (TCP) (an example of a single path communications protocol) based on the packets 540. To map the packets 540 to the proxy connection, the packet analyzer 505 may initiate and establish the proxy connection in accordance with the multipath communications protocol between the appliance 200 and the server 106. In some embodiments, the packet analyzer 505 may establish a subflow for the connection between the appliance 200 and the server 106 in accordance with the MPTCP. With the establishment of the proxy connection, the packet analyzer 505 may map the packets 540 to the proxy connection. The packet analyzer 505 may generate a new packet (as part of the copy of packets 540' or 540") in accordance with the multipath communications protocol. A body of the new packet may include the body of the original packet 540. A header of the new packet may include a connection identifier corresponding to the proxy connection. In some embodiments, the header of the new packet may include the connection identifier corresponding to the subflow in accordance with the MPTCP. Once generated, the packet analyzer 505 may forward the new packet along the proxy connection from the appliance 200 to the server 106. In some embodiments, the packet analyzer 505 may forward the new packet along the subflow in accordance with the MPTCP.

In contrast, when the first connection between the client 102 and the server 106 is determined to be in accordance with a multipath communications protocol, the packet analyzer 505 may forward the packets 540 in accordance with the multipath communications protocol. The packets 540 may be forwarded by the packet analyzer 505 from the client 102 to the server 106 via the appliance 200, and vice-versa, without any mapping as when the first connection is determined to be in accordance with a single path communications protocol. In some embodiments, the packet analyzer 505 may determine that the first connection between the client 102 and the server 106 is in accordance with the Quick User Datagram Protocol Internet Connection (QUIC) (an example of a multipath communications protocol) based on the packets 540. In some embodiments, the packet analyzer 505 may forward the packets 540 via the first connection, in response to determining that the first connection is in accordance with QUIC. In some embodiments, the packets analyzer 505 may generate a first copy of packets 540' to provide to the link quality estimator 510 and a second copy of packets 540" to provide to the policy manager 515.

Based on the packets 540' parsed by the packet analyzer 505, the link quality estimator 510 executing on the appliance 200 may calculate, estimate, or otherwise determine a link quality for each link 560 to which to communicate with the server 106. As discussed above, each link 560 may be one of multiple communication paths between the appliance 200 and the server 106. The link quality for the link 560 may be a measure of a Quality of Service (QoS) of communication between the appliance 200 and the server 106 via the link 560. The link quality for the corresponding link 560 may include a network bandwidth (measured in bits per second), a latency, a variation in packet delay (sometimes referred to as jitter), a packet loss rate, error rate (sometimes referred to as bit error rate), or any other measures and any combination thereof. In calculating the link quality for each link 560, the link quality estimator 510 may determine a size (measured in bytes) of the packets 540' to be forwarded from the appliance 200 to the server 106.

In some embodiments, the link quality estimator 510 may determine the network bandwidth of each link 560 by calculating a receive window size for the server 106 and a return trip time for communications (e.g., packets 540') between the appliance 200 and the server 106 via the link 560. The link quality estimator 510 may calculate the return trip time for communications between the appliance 200 and the server 106 via the link 560 using a ping test. In some embodiments, the link quality estimator 510 may estimate the network latency by calculating a predicted time elapsed between forwarding the packets 540' from the appliance 200 to the server 106 via the link 560 and receiving a response from the server 106 via the link 560. In some embodiments, the link quality estimator 510 may estimate the variation in packet delay for communications between the appliance 200 and the server 106 via the link 560 by measuring variations in network bandwidth over a predefined time window. In some embodiments, the link quality estimator 510 may estimate the packet loss rate for the link 560 by sending test packets over the link 560 from the appliance 200 and the server 106 and waiting for a response to the test packets from the server 106 via the link 560. A number of test packets sent may be determined based on the number of packets 540' from the client 102. Using the number of test packets and the number of responses, the link quality estimator 510 may determine the packet loss rate for the link 560. In some embodiments, the link quality estimator 510 may determine the error rate for the link 560 by measuring noise over a predefined time window in the link 560 over the network 104'. Based on the noise measured over the predefined time window and the size of packets 540', the link quality estimator 510 may calculate the error rate for the link 560.

Once the link qualities for the set of links 560 are calculated or estimated, the link quality estimator 510 may sort the set of links 560 by link quality. In some embodiments, the link quality estimator 510 may determine the link quality based on a combination (e.g., a weighted average) of the determined network bandwidth, latency, variation in packet delay, packet loss rate, and error rate, among other measures. The set of links 560 may be sorted or ranked in ascending or descending link quality. In some embodiments, the set of links 560 may be sorted or ranked in accordance to the combination of measures. In some embodiments, the link quality estimator 510 may use any number of sorting algorithms (e.g., quick sort, merge sort, bubble sort, binary tree sort) to rank the set of links 560 by link quality. In some embodiments, the link quality estimator 510 may generate a set of link quality estimates 545 to provide to the link selector 520. The set of link quality estimates 545 may include the set of links 560 sorted by the estimated link qualities for forwarding the packets 540' via the respective link 560. Upon generation, the link quality estimator 210 may provide the set of link quality estimates 545 for the set of links 560 to the link selector 520.

Concurrent to or subsequent to the determination of link qualities for the set of links 560, the policy manager 515 executing on the appliance 200 may identify one or more policies to apply the packets 540" communicated between the client and the server. The application of the policy may result in a change in the initial destination address, the initial destination port, or the connection identifier corresponding link 560 initially designated for the packets 540". Each policy may be applicable to or associated with the entire set or a particular set of packets 540". In some embodiments, each policy may be applicable to or associated with a pre-specified content of the body in the packets 540". Each policy may specify an addition, a deletion, or a modification to the contents of the packets 540". In some embodiments, the policies may be maintained on a database accessible by the policy manager 515. The policy to be applied by the policy manager 515 may include an application-specific policy, a firewall policy, a quality of signal (QoS) policy, an intrusion detection system (IDS) signature policy, and an intrusion prevention system (IPS) signature policy, among others.

To identify which policies to apply, the policy manager 515 may inspect the packets 540". In some embodiments, the policy manager 515 may parse each packet 540" to identify contents in the header and of the body of the packet 540". The policy manager 515 may compare the contents of the body of the packet 540" to a set of preset rules. Each preset rule may correspond to one of the policies. In some embodiments, the set of preset rules may include expressions particular to accessing resources for an application. In some embodiments, the set of preset rules may include a source address or a destination address in the packet 540" identifying a protected source or a protected destination (e.g., the client 102 or the server 106). In some embodiments, the set of preset rules may include a predesignated signature in the packet 540" indicative of malicious behavior (e.g., intrusion, virus, or Trojan horse) or anomalous behavior. The predesignated signature may include expressions previously determined using pattern recognition to detect malicious behavior. In some embodiments, the set of preset rules may include expressions indicating a priority level for the packet 540". The policy manager 515 may determine which of the set of preset rules the contents of the packet 540" matches.

In some embodiments, the policy manager 515 may determine that the content of the packet 540" matches the preset rule corresponding to the application-specific policy. The preset rule corresponding to the application-specific policy may indicate accessing of resources for the particular type of application (e.g., an email application, a word processor, or an Internet browser). In some embodiments, the policy manager 515 may identify the application executing on the client 102 associated with the packet 540" from parsing the packet 540". The identification of the application by the policy manager 515 may be based on matching with the preset rule. When the contents of the packet 540" matches the preset rule for the application-specific policy, the policy manager 515 may identify the application-specific policy to apply to the packets 540". The application-specific policy may be applicable to packets 540" communicated in conjunction with accessing resources for a particular application. The application-specific policy may specify a predetermined modification to the contents of the packet 540" communicated in conjunction with accessing the resources for the application. Once selected, the policy manager 515 may provide a policy selection 550 for the packets 540 to the link selector 520.

In some embodiments, the policy manager 515 may determine that the content of the packet 540" matches the preset rule corresponding to the firewall policy. The preset rule corresponding to the firewall policy may include the source address or the destination address in the packet 540" identifying the protected source or the protected destination (e.g., the client 102 or the server 106). The firewall policy may be applicable to packets 540" generated by certain clients 102 or servers 106 identified as under protection. The firewall policy may specify packets 540" containing the predesignated types of data communicated via the appliance 200 are to be dropped, allowed, or altered. In some embodiments, the firewall policy may specify that the 540" is to undergo additional inspect to determine whether the packet 540" is permitted to be forwarded to the client 102 or the server 106 by the appliance 200. Once selected, the policy manager 515 may provide the policy selection 550 for the packets 540 to the link selector 520.

In some embodiments, the policy manager 515 may determine that the content of the packet 540" matches the preset rule corresponding to the QoS policy. The QoS policy may be applicable to packets 540" with priority levels greater than a predesignated priority level. The QoS policy may specify that packets 540" labeled with priority levels greater than the predesignated priority level are to be communicated by the appliance 200 to the client 102 or the server 106 ahead of packets 540" with priority levels less than the predesignated priority level. In some embodiments, the policy manager 515 may parse the contents of the packet 540" to identify the priority level. The policy manager 515 may compare the priority level of the packet 540" to the predesignated priority level of the preset rule for the QoS policy. If the priority level of the packet 540" is determined to be greater than the predesignated priority level, the policy manager 515 may identify the QoS policy to apply to the packet 540". Otherwise, if the priority level of the packet 540" is determined to be less than the predesignated priority level, the policy manager 515 may identify that the QoS is not to apply to the packet 540". Once selected, the policy manager 515 may provide the policy selection 550 for the packets 540 to the link selector 520.

In some embodiments, the policy manager 515 may determine that the content of the packet 540" matches the preset rule corresponding to the IDS signature policy and the IPS signature. The preset rule corresponding to the IDS signature policy or the IPS signature policy may include the predesignated signature in the packet 540" indicative of malicious behavior (e.g., intrusion, virus, or Trojan horse) or anomalous behavior. The predesignated signature may include expressions previously determined using pattern recognition to detect malicious behavior. The IDS signature policy may specify that the packet 540" is to undergo additional inspection to determine whether the packet 540" is permitted to be forwarded to the client 102 or the server 106 by the appliance 200. The IPS signature policy may specify that the packet 540" is to be dropped from forwarding to the client 102 or the server 106 via the appliance 200. Once selected, the policy manager 515 may provide the policy selection 550 for the packets 540 to the link selector 520.

The link selector 520 executing on the appliance 200 may select a second interface from a set of second interfaces (e.g., the set of links 560) via which to communicate the packets 540 between the client 102 and the server 106. The second interface may correspond to or may be one of the set of links 560. In some embodiments, the second interface may be to the same server 106 as initially designated in the packets 540. In some embodiments, the second interface may be to another server 106 different from the server 106 initially designated in the packets 540. The selection of the second interface by the link selector 520 may be based on the configuration mapping 530, the link quality 545 for each link 560 estimated by the link quality estimator 510, and the policy selection 550 identified by the policy manager 515. The configuration mapping 530 may specify which link 560 is to be selected based on specified link qualities for the links 560 and a specified policy. The configuration mapping 530 may be any data structure, such as an array, a table, a matrix, a binary tree, a hash map, a heap, and a linked list, among other, to map specified link qualities of the links 560 and the specified policies to the link 560 to be selected for the packets 540. The link 560 to be selected may be indexed or arranged by a corresponding policy and a corresponding link quality. In some embodiments, the link 530 to be selected in accordance with the configuration mapping 530 may be independent of the estimated link quality 545 and may be dependent on the policy selection 550. In some embodiments, the link 560 to be selected in accordance with the configuration mapping 530 may be independent of the policy selection 550 and dependent of the estimated link quality 545. The configuration mapping 530 may be, for example, of the following form:

| Policy | Initial Interface | Updated Interface |
|---|---|---|
| QoS Policy: High priority | x | Interface with highest link quality |
| Office 365 ™ traffic | x | Interface routed to Office 365 ™ server |
| IDS signature y matches | x | Interface routed to a security engine for further investigation |

Using the estimated link qualities 545 and the policy selection 550, the link selector 520 may traverse through the configuration mapping 530 to select the link 560. In some embodiments, the link selector 520 may compare the policy selection 550 with specified policies for each link 560. In some embodiments, the link selector 520 may compare the estimated link quality 545 with specified link qualities for each link 560. In some embodiments, the link selector 520 may identify a set of potential links 560 from the configuration mapping 530 having the specified policy matching the policy selection 550 identified by the policy manager 515. From the identified set of potential links 560, the link selector 520 may determine whether the estimated link quality 545 for each link 560 satisfies the specified link quality for the configuration mapping 530. The link selector 520 may determine that the estimated link quality 545 satisfies the link quality specified by the configuration mapping 530 when the estimated link quality 545 is greater than or equal to the specified link quality or when the link 560 is independent of the estimated link quality 545. In some embodiments, the link selector 520 may identify a filtered set of potential links 560 with estimated link qualities 545 satisfying the link quality specified by the configuration mapping 530. From the filtered set of potential links 560, the link selector 520 may select the link 560 as the second interface via which to communicate packets 540 between the client 102 and the server 106. When there are multiple links 560 in the filter set, the link selector 520 may identify the link 560 with the highest link quality as determined by the link quality estimator 510.

With the selection of the link 560, the routing engine 525 executing on the appliance 200 may initiate and establish a second connection between the client 102 and the server 560 via the second interface instead of the first interface. In some embodiments, the second connection may be between the appliance 200 and the server 106 corresponding to the link 560. To initiate the second connection via the second interface, the routing engine 525 may identify the connection identifier for the selected link 560. In some embodiments, the routing engine 525 may access the configuration mapping 530 to identify the connection identifier. As discussed above, the connection identifier may correspond to a new subflow for communications in accordance with the Multipath Transmission Control Protocol (MPTCP). The connection identifier may correspond to a connection for communications in accordance with the Quick User Datagram Protocol Internet Connection (QUIC). Using the connection identifier, the routing engine 525 may initiate the second connection via the second interface. In some embodiments, the second connection may be with the same server 106 as the first connection. In some embodiments, the second connection may be with a server 106 different from the server 106 initially designated by the first connection.

Once the second connection is established, the routing engine 525 may forward subsequently received packets 540 from the client 102 or the server 106 via the second interface (e.g., one of the links 560) selected by the link selector 520. In some embodiments, the routing 525 may switch over the packets 540 from the client 102 or the server 106 from the first interface for the first connection to the second interface for the second connection. As discussed above, the packet analyzer 505 may determine whether the first connection for the packets 540 communicated between the client 102 and the server 106 is in accordance to a single path communications protocol or a multipath communications protocol. When the first connection is in accordance to the single path communications protocol, the routing engine 525 may initiate the second connection using the proxy connection mapping the packets 540 from the single communications protocol to the multipath communications protocol. In some embodiments, the routing engine 525 may initiate a new subflow with the second connection in accordance with MPTCP, in response to the determination that the first connection is in accordance with the Transmission Control Protocol (TCP). The new subflow may correspond to the connection identifier. The routing engine 525 may map the packets 540 from the first connection to the new subflow for the second connection in accordance with MPTCP (e.g., using "MP_JOIN"). In some embodiments, the routing engine 525 may generate a new packet in accordance with the multipath communications protocol. A body of the new packet may include the body of the original packet 540. A header of the new packet may include the connection identifier of the second interface selected by the link selector 520. In some embodiments, the header of the new packet may include the connection identifier corresponding to the subflow in accordance with the MPTCP. Once generated, the routing engine 525 may forward the new packet along the proxy connection from the appliance 200 to the server 106. In some embodiments, the routing engine 525 may forward the new packet along the subflow in accordance with the MPTCP. In some embodiments, the routing engine 525 may terminate the proxy connection initiated by the packet analyzer 505, upon initiating and establishing the second connection between the appliance 200 and the server 106.

On the other hand, when the first connection is in accordance with a multipath communications protocol, the routing engine 525 may initiate another connection also with the multipath communications protocol using the connection identifier. In some embodiments, the connection identifier for the second connection may be the same as the connection identifier for the first connection. In some embodiments, the routing engine 525 may initiate a new connection for the second connection in accordance with the UDP or QUIC protocols using the connection identifier of the first connection. In some embodiments, the routing engine 525 may copy subsequently received packets 540 from the client 120 to forward via the second interface. A body of the copied packet may include the body of the original packet 540. A header of the copied packet may include the connection identifier of the second interface selected by the link selector 520. In some embodiments, the routing engine 525 may set the connection identifier of the second connection to the connection identifier of the first connection. The routing engine 525 may modify a source address and a source port of the subsequently received packets 520 to refer to the appliance 200 instead of the client 102. Once the source address and the source port of the subsequently received packet 540 is modified, the routing engine 525 may forward the packet 540 via the second interface for the second connection established between the appliance 200 and the server 106.

Figure 5C:
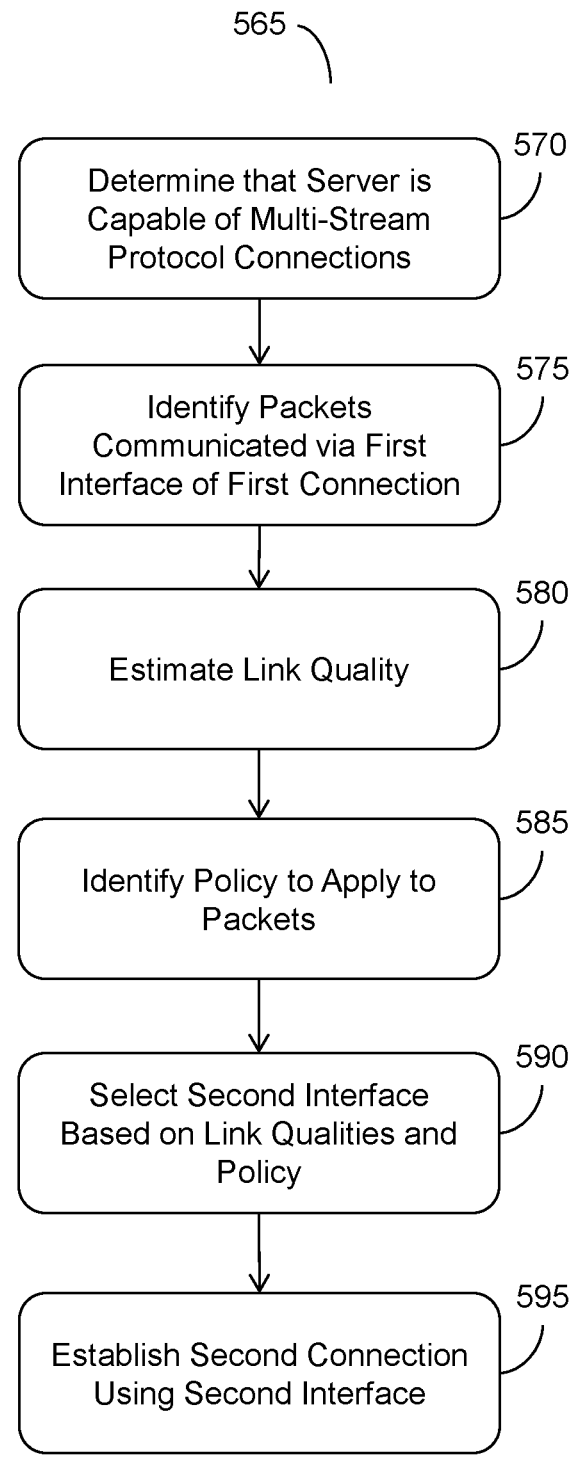
FIG. 5C is a flow diagram of a method of performing multi-stream routing.

Referring to FIG. 5C, one method of a method 565 of performing multi-stream routing is depicted. The functionalities of method 565 may be implemented using, or performed by, the components described in FIGS. 1-5B. In brief overview, a device may determine that a server is capable of multi-stream protocol connections (570). The device may identify packets communicated via a first interface of a first connection (575). The device may estimate a link quality (580). The device may identify a policy to apply to the packets (585). The device may select a second interface based on a configuration mapping (590). The device may establish a second connection using a second interface (595).

In further detail, the device may determine that a server is capable of multi-stream protocol connections (570). In determining whether the server is capable of multi-stream protocol connections, the device may parse packets originating from the server. The multi-stream protocol connections may allow for two network elements (e.g., the device and the server) to communicate with each other over multiple communication paths. The packets may include one or more option fields, and one of the option fields may indicate whether the server is capable of multi-stream protocol connections. By parsing, the device may identify the option field indicating whether the server is capable of multi-stream protocol connections. If the option field indicates that the server is capable, the device may determine that the server is capable of multi-stream protocol connections. Otherwise, if the option field indicates that the server is incapable or the packets lack the option field, the device may determine that the server is incapable of multi-stream protocol connections.

The device may identify packets communicated via a first interface of a first connection (575). The first interface may be one of multiple communication paths between the client and the server. The first connection may be between a client and the server via the device deploy intermediary to the client and the server. The first connection may be in accordance with a single path communications protocol (e.g., Transmission Control Protocol (TCP)) or a multipath communications protocol (e.g., Quick User Datagram Protocol Internet Connection (QUIC)). Each packet may include a header and a body. The device may parse the packet to identify contents of the header and contents of the body. The header may include a source address, a source port, a destination address, and a destination port, among other fields. For packets in accordance with the multipath communications protocol, the header may also include a connection identifier. By parsing the packets communicated between the client and the server, the device may determine whether the first connection is in accordance with the single path communications protocol or the multipath communications protocol. When the first connection is determined to be in accordance with the single path communications protocol, the device may initiate a proxy connection in accordance with the multipath communications protocol. The device may map the packets from the first connection to the proxy connection by copying the packets to generate new packets. The new packets may include a connection identifier in the header corresponding to the proxy connection.

The device may estimate a link quality (580). The link quality may be estimated for each link (sometimes referred to as an interface). The estimated link quality may be a predicted measure of Quality of Service (QoS) of communications between the device and the server. The estimated link quality may include a network bandwidth (measured in bits per second), a latency, a variation in packet delay (sometimes referred to as jitter), a packet loss rate, error rate (sometimes referred to as bit error rate), or any other measures and any combination thereof. The device may perform various network metrics tests to estimate the link quality. Once the link qualities for the links are estimated, the device may sort or rank the links by link qualities in ascending or descending order.

The device may identify a policy to apply to the packets (585). The application of policy may result in a change in the initial destination address, the initial destination port, or the connection identifier of the first connection. Each policy may be applicable to or associated with the packets communicated between the client and the server. Each policy may specify an addition, a deletion, or a modification to the content of the packets. The policy may include an application-specific policy, a firewall policy, a quality of signal (QoS) policy, an intrusion detection system (IDS) signature policy, and an intrusion prevention system (IPS) signature policy, among others. To identify which policy is to apply, the device may parse the packets to identify the contents. The device may compare the contents of the packets with a set of preset rules. Each preset rule may correspond to one of the policies. Upon determining a match between the contents of the packets with one of the rules, the device may identify the corresponding policy to apply to the packets.

The device may select a second interface based on a configuration mapping (590). The configuration mapping may specify which of the interfaces (sometimes referred to as links) to select based on a specified link quality for the interfaces and a specified policy. The configuration mapping may be maintained on a database accessible by the device. Using the estimated link quality and the identified policy, the device may traverse the configuration mapping. The device may compare the identified policy with a specified policy for each interface. The device may compare the estimated link quality with a specified link quality for each interface. By comparing with the configuration mapping, the device may identify a set of potential interfaces with a specified policy matching the identified policy and with a specified link quality matching an estimated link quality. The device may select the interface with the highest estimated link quality.

The device may establish a second connection using the second interface (595). To establish the second connection, the device may identify a connection identifier for the second interface selected based on the configuration mapping. The device may create or initiate the second connection via the second interface via the connection identifier. Once established, the device may forward subsequently received packets via the second interface for the second connection. As discussed, the first connection may be established in accordance with the single path communication protocol or the multipath communications protocol. If the first connection is in accordance with the single path communications protocol, the device may map the subsequently received packets to the second connection in accordance with the multipath communications protocol. The mapped packets may include the connection identifier corresponding to the second connection. If the first connection is in accordance with the multipath communications protocol, the device may forward the packets via the second connection for the second connection. The device may set the connection identifier of the second connection to the connection identifier of the first connection. The device may also modify the source address and the source port of the packets from the client to the device.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

It will be further understood that various changes in the details, materials, and arrangements of the parts that have been described and illustrated herein may be made by those skilled in the art without departing from the scope of the following claims.

We claim:

1. A method comprising:
   determining, by a device, a link quality of a plurality of links providing multiple communication paths between the device and a server;
   maintaining, by the device, a configuration mapping that identifies which of the plurality of links to use based at least on the link quality and a policy;
   identifying, by the device responsive to receiving one or more packets from a client destined to the server via a single path communication protocol over a first link of the plurality of links with the server, that the server supports a multi-stream protocol;
   selecting, by the device using the configuration mapping, a second link from the plurality of the links based at least on the policy identified by the device to apply to the one or more packets; and
   communicating, by the device, the one or more packets via the second link to the server.

2. The method of claim 1, wherein the link quality comprises a measure of a quality of service (QoS) of communications via at least the device and the server over a respective link of the plurality of links.

3. The method of claim 1, further comprising determining the link quality based at least on one or more of a network bandwidth, a latency, a variation in packet delay, a packet loss rate or an error rate via at least the device and a respective link of the plurality of links.

4. The method of claim 1, wherein the configuration mapping comprises identification of the policy and identification of the first link.

5. The method of claim 1, wherein the single path communication protocol comprises one of a transport control protocol (TCP), user datagram protocol (UDP) or Datagram Congestion Control Protocol (DCCP).

6. The method of claim 1, wherein the multi-stream protocol comprises one of Multipath TCP (MPTCP), Stream Control Transmission Protocol (SCTP), Resource Reservation Protocol (RSVP), Session, Initial Protocol (SIP) or Quick UDP Internet Connections (QUIC).

7. The method of claim 1, further comprising determining, by the device, that content of the one or more packets matches a rule of the policy.

8. The method of claim 1, further comprising selecting, by the device using the configuration mapping, the second link from the plurality of the links based at least on the link quality and the policy.

9. The method of claim 8, further comprising traversing the configuration mapping to identify one or more links matching the policy.

10. The method of claim 9, further comprising selecting the second link with a higher link quality from the one or more links matching the policy.

11. A system comprising:
a device comprising one or more processors, coupled to memory and configured to:
  establish a link quality of a plurality of links providing multiple communication paths between the device and a server;
  maintain a configuration mapping that identifies which of the plurality of links to use based at least on the link quality and a policy;
  identify, responsive to receiving one or more packets from a client destined to the server via a single path communication protocol over a first link of the plurality of links with the server, that the server supports a multi-stream protocol;
  select, using the configuration mapping, a second link from the plurality of the links based at least on the policy identified by the device to apply to the one or more packets; and
  communicate, the one or more packets via the second link to the server.

12. The system of claim 11, wherein the link quality comprises a measure of a quality of service (QoS) of communications via at least the device and the server over a respective link of the plurality of links.

13. The system of claim 11, wherein the device is further configured to determine the link quality based at least on one or more of a network bandwidth, a latency, a variation in packet delay, a packet loss rate or an error rate via at least the device and a respective link of the plurality of links.

14. The system of claim 11, wherein the configuration mapping comprises identification of the policy and identification of the first link.

15. The system of claim 11, wherein the single path communication protocol comprises one of a transport control protocol (TCP), user datagram protocol (UDP) or Datagram Congestion Control Protocol (DCCP).

16. The system of claim 11, wherein the multi-stream protocol comprises one of Multipath TCP (MPTCP), Stream Control Transmission Protocol (SCTP), Resource Reservation Protocol (RSVP), Session, Initial Protocol (SIP) or Quick UDP Internet Connections (QUIC).

17. The system of claim 11, wherein the device is further configured to determine that content of the one or more packets matches a rule of the policy.

18. The system of claim 11, wherein the device is further configured to select, using the configuration mapping, the second link from the plurality of the links based at least on the link quality and the policy.

19. The system of claim 18, wherein the device is further configured to traverse the configuration mapping to identify one or more links matching the policy.

20. The system of claim 19, wherein the device is further configured to select the second link with a higher link quality from the one or more links matching the policy.

* * * * *